(12) United States Patent
Dietrich, Sr.

(10) Patent No.: US 10,779,452 B2
(45) Date of Patent: Sep. 22, 2020

(54) ROTARY SLURRY INJECTOR

(71) Applicant: William J Dietrich, Sr., Morton, IL (US)

(72) Inventor: William J Dietrich, Sr., Morton, IL (US)

(*) Notice: Subject to any disclaimer, the term of this patent is extended or adjusted under 35 U.S.C. 154(b) by 0 days.

(21) Appl. No.: 15/685,829

(22) Filed: Aug. 24, 2017

(65) Prior Publication Data

US 2018/0054948 A1   Mar. 1, 2018

Related U.S. Application Data

(60) Provisional application No. 62/381,419, filed on Aug. 30, 2016.

(51) Int. Cl.
| | | |
|---|---|---|
| *A01B 17/00* | (2006.01) | |
| *A01C 23/02* | (2006.01) | |
| *A01C 5/06* | (2006.01) | |
| *A01C 3/06* | (2006.01) | |

(52) U.S. Cl.
CPC ............ *A01B 17/002* (2013.01); *A01C 5/066* (2013.01); *A01C 23/022* (2013.01); *A01C 3/06* (2013.01); *A01C 5/064* (2013.01)

(58) Field of Classification Search
CPC ........... A01B 5/04; A01B 15/16; A01B 15/18; A01B 17/002
USPC ........ 172/186, 537, 551, 570, 572, 573, 602
See application file for complete search history.

(56) References Cited

U.S. PATENT DOCUMENTS

| | | | | |
|---|---|---|---|---|
| 223,501 A | * | 1/1880 | Green | A01C 5/068 172/538 |
| 4,759,411 A | * | 7/1988 | Williamson | A01B 15/18 172/572 |
| 5,495,897 A | * | 3/1996 | Javerlhac | A01B 15/16 172/558 |
| 6,701,856 B1 | * | 3/2004 | Zoske | A01C 5/066 111/121 |

(Continued)

OTHER PUBLICATIONS

VTI L.L.C. Vertical Till Injector Literature 3 pages from www.vtillc.com on Nov. 7, 2017.

(Continued)

*Primary Examiner* — Gary S Hartmann

(57) ABSTRACT

The applicator embodiments for applying liquid livestock waste in the form of a slurry beneath the soil surface. Some embodiments include a leading swivel-mounted, spring-cushioned, conical-shaped wavy coulter blade angularly offset from the direction of travel which displaces the soil laterally in forming a furrow adapted to receive slurry. The coulter may be trailed by a single or a pair of optionally spring-cushioned rotary closing blade(s) that are to close the furrow containing the deposited liquid. One or more rotary closing blade(s) is optionally spring loaded to follow the soil contour. Some alternative embodiments utilize a rotary covering blade pivot assembly that is positioned lower and more forward, a larger spring for more blade depth, and/or a single or a pair of rotary covering blades for a scooping movement of the soil and results in more soil to cover the deposited liquid. In various embodiments, a number of injector units are mounted in a side-by-side relation in a spaced manner and springs maintain individual assembly alignment when blades are not engaged in the soil.

8 Claims, 5 Drawing Sheets

(56) References Cited

U.S. PATENT DOCUMENTS

| 9,226,437 B2* | 1/2016 | Dietrich, Sr. | A01C 5/064 |
| 2014/0251192 A1* | 9/2014 | Dietrich, Sr. | A01C 5/064 |
| | | | 111/121 |

OTHER PUBLICATIONS

Zoske Mfg. Cyclone No-Till Manure Injector 2 pages from www.zoskesmfg.com on Nov. 8, 2017.
Bazooka Farmstar Inc Coulter Till Literature 1 page from www.bazookafarmstar.com.
Bazooka Farmstar Inc Coulter Till Injector 1 page from www.bazookafarmstar.com on Nov. 8, 2017.
Bazooka Farmstar Inc Phantom Coulter Till Injector 1 page from www.bazookafarmstar.com.
Soil Warrior Environmental Tillage Systems 1 page from www.soilwarrior.com.

* cited by examiner

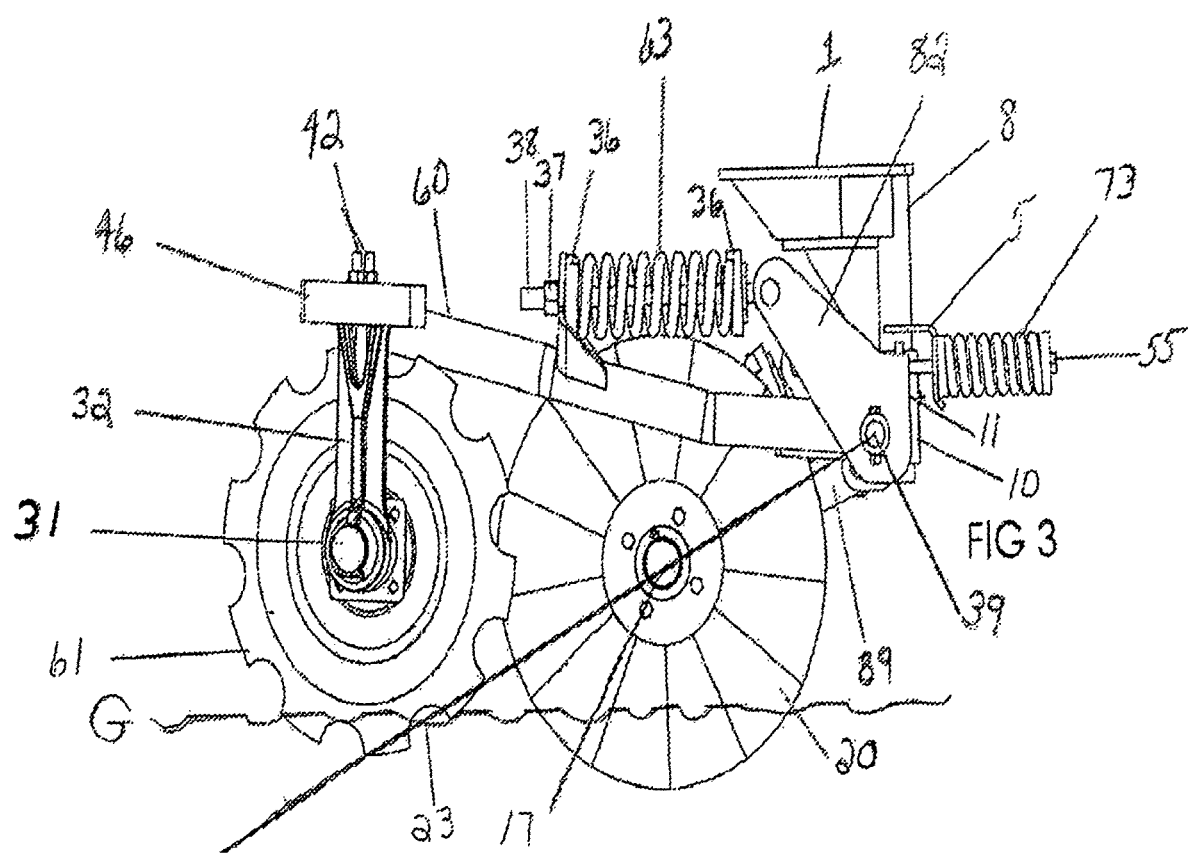

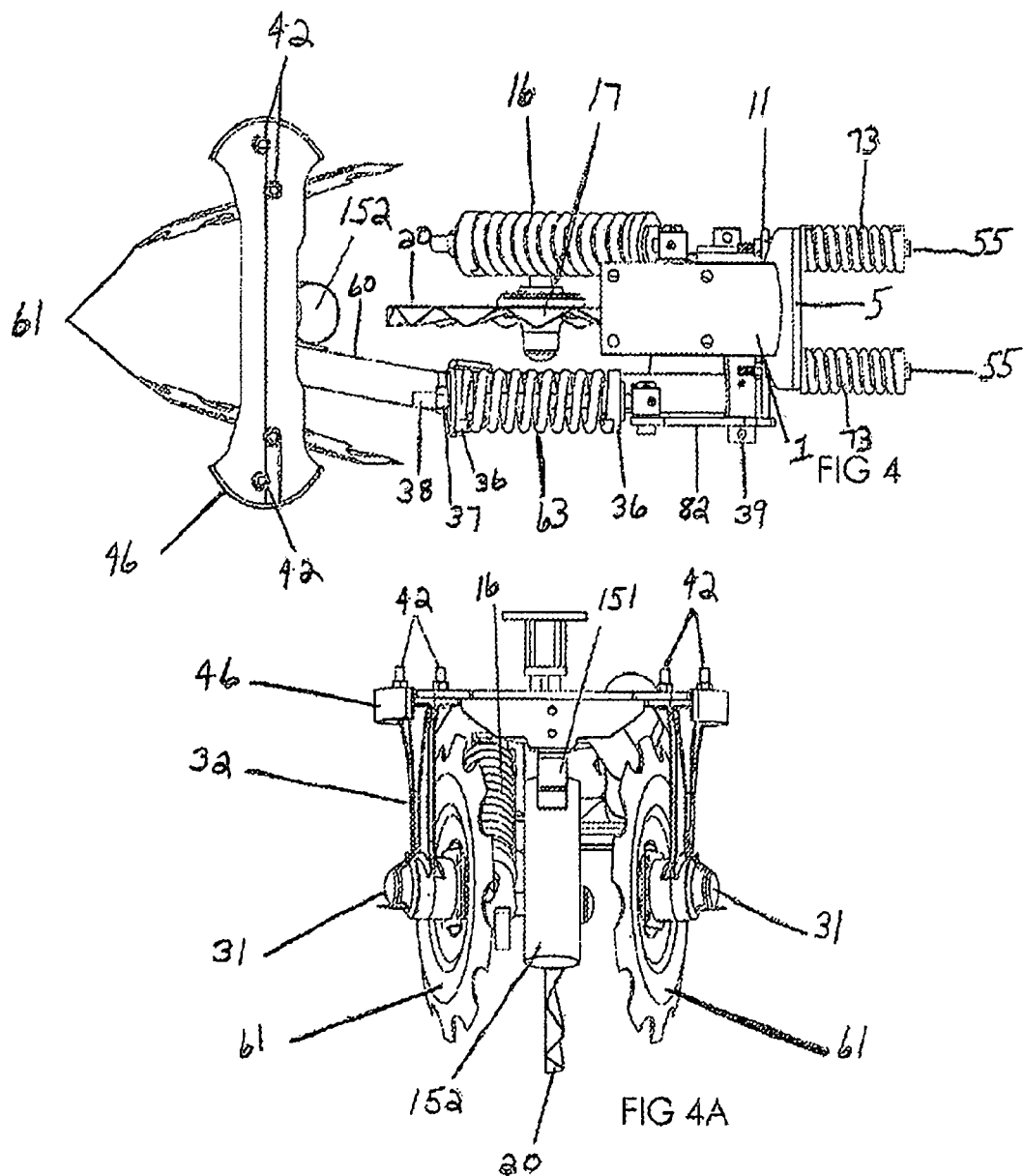

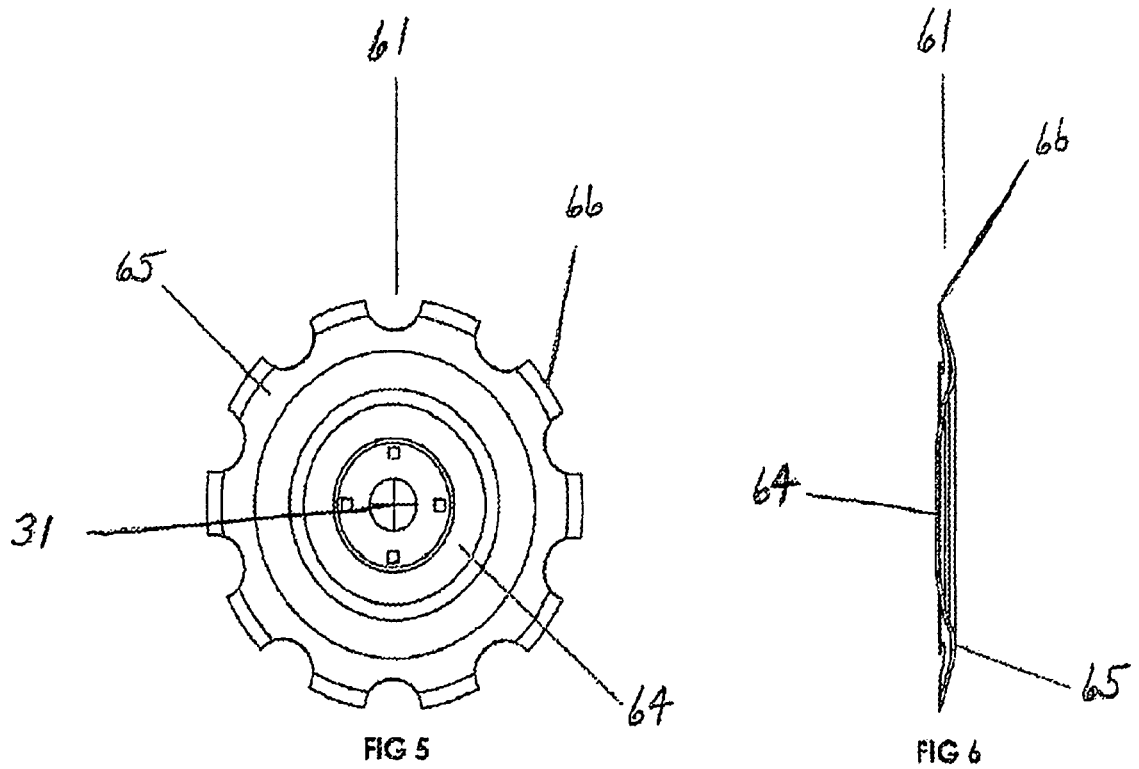

ROTARY SLURRY INJECTOR

CROSS REFERENCE TO RELATED APPLICATION

This application claims priority under 35 U.S.C. § 119 from prior provisional application No. 62/381,419 which was filed on Aug. 30, 2016, herein incorporated by reference.

BACKGROUND

This disclosure relates to slurry applicators such as liquid manure applicators; for example, apparatus for subsoil application of livestock waste in the form of slurry, e.g., a freely flowable mixture of liquid and solids.

SUMMARY

Some embodiments disclosed herein operate in a wide variety of soil types and heavy residue. Some embodiments employ one (1) conical shaped wavy blade to provide an opening in the soil. This coulter blade creates a slot and moves soil laterally. The conical shaped wavy blade is optionally swivel mounted allowing the blade to pivot. The portion ahead of the spindle operates parallel to the direction of travel. The portion behind the spindle moves the soil laterally. This provides a wider furrow than a wavy blade that does not have a conical shape.

The coulter is trailed by a single or a pair of rotary closing blade(s) which close the furrow containing the deposited slurry. The alternate embodiment utilizes a rotary covering blade pivot assembly that is positioned lower and more forward than at least some embodiments described herein and includes a single or a pair of rotary covering blade(s) for a scooping movement of the soil resulting in more soil to cover the deposited liquid. A larger spring is utilized resulting in more blade depth.

A slurry delivery tube is mounted behind the conical blade to deposit the liquid in the furrow created by the conical wavy blade.

BRIEF DESCRIPTION OF THE DRAWINGS

Referring now to the drawings, where like reference characters identify like elements throughout the various figures.

FIG. 3 is a right side elevation view of an alternate embodiment of the inventive rotary applicator for depositing livestock waste incorporating a forward lower pivot, a larger spring, and covering blades for applying more gallons per acre application. A line of draft is shown from the pivot to the covering blade soil contact.

FIG. 4 is an overhead view of the rotary applicator of FIG. 3.

FIG. 4A is a rear view of the rotary applicator of FIG. 3.

FIG. 5 is a side view of a notched covering blade with a raised center and a cupped outer periphery.

FIG. 6 is a cross-sectional view of a notched covering blade with a raised center and a cupped outer periphery shown in FIG. 5.

DETAILED DESCRIPTION

Figure 1:
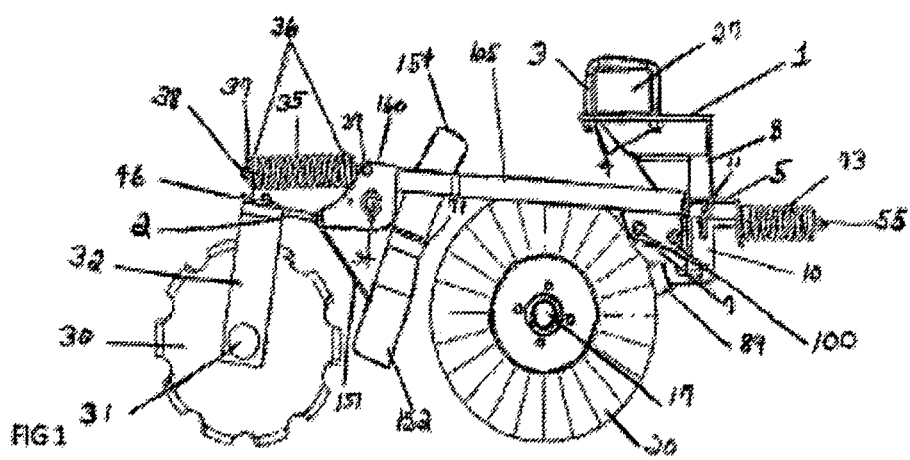
FIG. 1 is a right side elevation view of an embodiment of rotary applicator for depositing livestock waste.
Figure 2:
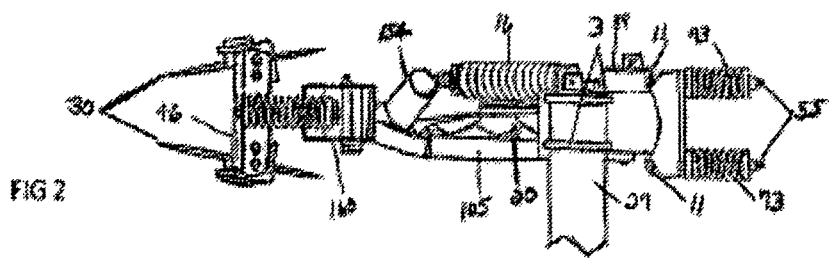
FIG. 2 is an overhead view of the rotary applicator of FIG. 1.
Figure 7:
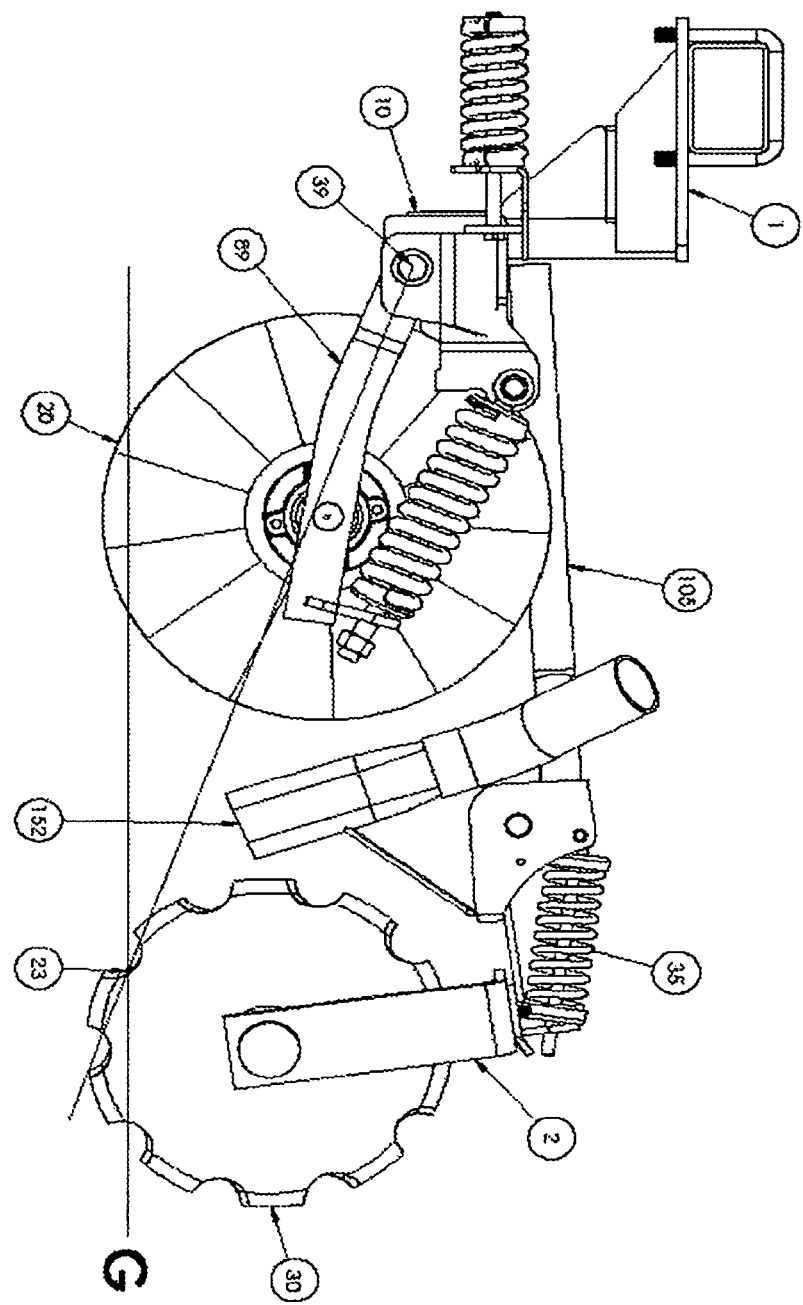

Referring to FIG. 1 & FIG. 2, a plurality of applicator units may be mounted on a wagon with a tool bar 27 drawn by a tractor (not shown). The tool bar 27, or frame, may have its own support wheels, or may be mounted to a tank carrying the slurry. In any case, tool bar 27 trails a slurry wagon for a large amount of livestock waste which is applied to the field and maintains individual assembly alignment when the blades are not engaging the soil. Mounting assembly 1 is optionally coupled to (e.g., tightly clamped against) the tool bar 27 with one or more fasteners such as U-Bolts 3 and nuts 4.

One or more (e.g., two) coil springs 73 or other biasing elements are compressed (e.g., preloaded) and pivotally connected to the spring base 5 by one or more fasteners, such as 2 bolts 55 (one for each spring 73) to provide alignment when the units are not engaging soil. In some embodiments, tabs 11 are welded to sleeve 10 to provide support for spring bolts 55. A shaft 8 is coupled (e.g., welded) to the mount 1 (e.g., to a lower portion thereof). A sleeve 10 or other coupling optionally allows front coulter assembly 89 to swivel, e.g., (about a generally vertical axis). The front coulter assembly 89 optionally includes a front wavy conical shaped coulter 20. The front coulter assembly 89 optionally has common features and/or functionality in some embodiments to coulter assemblies used on various agricultural tillage tools. Conical shaped coulter blade 20 is mounted to a hub 17 or other connection.

As the leading edge of the wavy conical shaped coulter blade 20 enters the soil, the coulter blade 20 is allowed to swivel on sleeve 10 (e.g., to accommodate turns, etc.). As the coulter blade 20 rotates forward, its conical shape enters the soil generally along the line of travel of the coulter blade 20 and soil is lifted and moved laterally behind the coulter blade 20 providing a furrow for slurry to flow into. A spring 16 or other biasing element optionally resiliently biases the coulter blade 20 into the soil and optionally allows the coulter blade 20 to clear rocks or other field obstructions.

In some embodiments, a closing blade mount 105 is attached to coulter pivot assembly 7 with two (2) bolts 100 and supports the closing blade pivot Appl. assembly 2. In some embodiments, a pivot bolt of pivot 39 protrudes through the spring pivot T-bolt 38. A plurality (e.g., a pair) of spaced plates 160 optionally support pin 34 of the closing blade pivot assembly 2. One or more (e.g., a pair) of furrow closing blades 30 are laterally spaced and optionally operate at acute angles relative to the direction of travel thereby forming a berm of loose soil on the top of the slots formed by the front coulter blade 20. In operation, closing blades 30 optionally cover this area, which in some implementations reduces odor and/or prevents liquid from flowing down a slope on steep hills. To allow furrow closing blades 30 to follow the soil contour, pin 34 or other connection allows closing blade pivot assembly 2 to pivot about a generally horizontal axis. Formed cross plate 46 optionally has slotted holes therein to allow for angular adjustment of the furrow closing blades 30 relative to the direction of travel. Closing blades 30 are rollingly supported on a hub 31 or other connection which is optionally coupled (e.g., welded) to support arms 32. A spring 35 or other biasing element is optionally disposed about and extends the length of bolt 38. A nut 37 disposed on bolt 38 limits downward movement of the closing blade pivot assembly 2 and furrow closing blades 30. Castings 36 are positioned on each end of spring 35 to fit the spring coil.

A bar 151 supports a short delivery tube 152 which optionally extends behind the front coulter blade 20 to facilitate delivery in the slot created by the front coulter 20. A clamp 71 attaches delivery hose 154 to delivery tube 152.

FIGS. 3, 4, and 4A illustrate an alternative embodiment including a covering blade pivot assembly that is optionally positioned lower and more forward than the embodiment illustrated in FIGS. 1 and 2, optionally incorporates a larger spring, and differently-shaped rotary covering blades. Elements shown in FIGS. 3, 4, and 4A which are also illustrated in FIGS. 1 and 2 and discussed above are provided with the same element members throughout all of the figures.

Referring to FIGS. 3 and 4, covering blade pivot assembly 60 attaches to coulter pivot assembly 82 with pivot 39 (e.g., comprising a pin) and supports a single or a pair of rotary covering blades 61. In alternative embodiments, an Appl. alternative rotary soil displacement apparatus such as a closing blade (e.g., closing blade 30 may be used with the embodiment of FIGS. 3-4A. As described below, the lower, forward positioned pivot point 39 provides a draft angle which may be approximately 20°-25°, which in some implementation may result in deeper covering blade penetration.

In some embodiments, a spring 63 is optionally larger and/or creates a greater down pressure than the spring 35 described previously. For example, the spring 63 optionally imposes a down pressure during operation greater than about 150 pounds. A pair of rotary covering blades 61 optionally provides a scooping movement of the soil in operation which may result in more soil covering the deposited liquid. In some examples, for higher gallons per acre, Appl. injectors would be mounted with narrower spacing in the embodiment of FIGS. 3 and 4, optionally allowing for the use of only one (1) covering blade 61 per unit. In some examples, the optionally narrower spacing of the embodiment of FIGS. 3 and 4 provides more conical furrows than in other embodiments for slurry to flow into, in some cases resulting in higher gallons per acre.

In some embodiments, the pivot axis of pivot 39 about which the front coulter assembly 89 pivots is located forward of the rotational axis of the coulter 20 along the direction of travel. In some embodiments, the pivot axis of pivot 39 is disposed forward of the coulter 20 along the direction of travel. In some embodiments, a spring 63 is disposed forward of the covering blades 61. In some embodiments, the support arm 32 to which the covering blades 61 are rollingly coupled extends from a point forward of the rotational axis of the coulter 20 to a point rearward of the coulter 20.

In various embodiments disclosed herein, a draft angle 23 above the ground surface G may be measured from the location at which covering blades 61 enter the soil and the axis of pivot 39 about which the front coulter assembly 89 pivots. In various embodiments, the draft angle 39 is less than about 35 degrees, between 10 and 35 degrees, between 18 and 27 degrees, between 20 and 25 degrees, between about 20 and about 25 degrees, between approximately 20 and approximately 25 degrees, etc.

Referring to FIG. 5, there is shown a side elevation view of a rotary covering blade 61 optionally having a plurality of circumferentially arranged notches. The covering blade 61 optionally has a cupped outer periphery 65 and a raised center portion 64 (e.g., axially offset from the outer periphery 65) which are contemplated for use in the alternate embodiment or other embodiments. In some embodiments, the raised center portion 64 tends to prevent wet soil from filling the blade. In some embodiments, the cupped outer periphery 65 provides a scooping action allowing the covering blade 61 to move more soil to cover the excess liquid beyond the capacity of the furrow created by the conical shaped coulter blade 20 optionally resulting in higher gallons per acre than in other embodiments.

Referring to FIG. 6, there is shown a cross-sectional view of the notched rotary covering blade 61 with a raised center portion 64 and a cupped outer periphery 65 shown in FIG. 5.

What is claimed:

1. An applicator configured to travel along a direction of travel for depositing slurry beneath a soil surface, said applicator comprising:
- a support frame;
- a sleeve pivotally coupled to said support frame for pivoting about a generally vertical sleeve axis;
- a coulter support arm pivotally coupled to said sleeve for pivoting about a generally horizontal coulter support arm axis;
- a coulter support arm spring disposed to downwardly bias said coulter support arm;
- a coulter, said coulter being rollingly coupled to said coulter support arm for rolling about a generally horizontal coulter axis, such that said coulter displaces soil laterally relative to the direction of travel;
- a delivery tube is disposed aft of said coulter for depositing slurry in a furrow created by said coulter,
- a closing apparatus pivot assembly;
- a closing apparatus support arm pivotally coupled to the support frame for pivoting about a generally horizontal soil displacement apparatus support arm pivot axis, said soil displacement apparatus support arm pivot axis being disposed generally forward of said coulter axis;
- a soil displacement apparatus support arm spring operably coupled to said soil displacement apparatus support arm, said soil displacement apparatus support arm spring being disposed to downwardly bias said support arm; and
- at least a first rotary soil displacement apparatus supported on said soil displacement apparatus support arm, the first rotary soil displacement apparatus being disposed at least partially rearward of said coulter.

2. The applicator of claim 1, wherein each said rotary soil displacement apparatus comprises a covering blade, said covering blade comprising:
- a cupped outer periphery, said outer periphery having a plurality of circumferentially arranged notches; and
- a center portion for supporting a rotational axis, said center portion being axially offset relative to said cupped outer periphery.

3. An applicator of claim 1, wherein a draft angle is defined between a horizontal ground surface plane and a line, said line extending from a location where said first rotary soil displacement apparatus enters the soil to said soil displacement apparatus support arm pivot axis, and wherein said draft angle is less than about 35 degrees.

4. The applicator of claim 3, wherein said draft angle is greater than 10 degrees.

5. The applicator of claim 1, wherein said soil displacement apparatus support arm pivot axis is disposed forward of said coulter.

6. The applicator of claim 1, wherein said soil displacement apparatus comprises a closing blade.

7. The applicator of claim 1, wherein each said rotary soil displacement apparatus comprises a covering blade, said covering blade comprising:
- an outer periphery; and
- a center portion for supporting a rotational axis, said center portion being axially offset relative to said outer periphery.

8. The applicator of claim 7, wherein said outer periphery has a plurality of circumferentially arranged notches.

* * * * *